United States Patent
Kekre et al.

(10) Patent No.: US 7,610,319 B1
(45) Date of Patent: Oct. 27, 2009

(54) EFFICIENT OPERATIONS USING ASSISTANCE FROM SECONDARY SITE

(75) Inventors: Anand A. Kekre, Baner (IN); Pradip M. Kulkarni, Maharashtra (IN); Ankur P. Panchbudhe, Maharashtra (IN)

(73) Assignee: Symantec Operating Corporation, Cupertino, CA (US)

(*) Notice: Subject to any disclaimer, the term of this patent is extended or adjusted under 35 U.S.C. 154(b) by 648 days.

(21) Appl. No.: 10/790,657

(22) Filed: Mar. 1, 2004

(51) Int. Cl.
*G06F 12/00* (2006.01)
*G06F 17/30* (2006.01)

(52) U.S. Cl. .................... 707/204; 707/8; 711/162
(58) Field of Classification Search ............. 707/1–10, 707/100–104.1, 200–206; 710/21, 33; 711/143, 711/161, 162, 115, 116, 149
See application file for complete search history.

(56) References Cited

U.S. PATENT DOCUMENTS

| | | | | |
|---|---|---|---|---|
| 5,742,792 A | * | 4/1998 | Yanai et al. | 711/162 |
| 5,964,886 A | * | 10/1999 | Slaughter et al. | 714/4 |
| 6,779,093 B1 | * | 8/2004 | Gupta | 711/162 |
| 7,032,089 B1 | * | 4/2006 | Ranade et al. | 711/161 |
| 7,054,960 B1 | * | 5/2006 | Bezbaruah et al. | 710/33 |
| 7,149,858 B1 | * | 12/2006 | Kiselev | 711/162 |
| 7,305,529 B1 | * | 12/2007 | Kekre et al. | 711/162 |
| 2005/0050115 A1 | * | 3/2005 | Kekre | 707/204 |

OTHER PUBLICATIONS

March, et al., Allocating data and operations to nodes in distributed database design, Apr. 1995, IEEE, vol. 7, 305-317.*
Chang et al., Optimal routing for distributed computing systems with data replication, Sep. 4-6, 1996, IEEE, 42-51.*

* cited by examiner

*Primary Examiner*—Jean B Fleurantin
(74) *Attorney, Agent, or Firm*—Campbell Stephenson LLP

(57) ABSTRACT

Efficient replication using assistance from a secondary node involves in one embodiment modifying data of a data volume at a primary node to create modified data. The primary node transmits the modified data to a first secondary node, wherein the first secondary node comprises a first replica of the data volume. The first secondary node receives and processes the modified data to generate processed data. The first secondary node transmits the processed data to the primary node. The primary node, in turn, receives and transmits the processed data to a second secondary node, wherein the second secondary node comprises a second replica of the data volume.

27 Claims, 2 Drawing Sheets

EFFICIENT OPERATIONS USING ASSISTANCE FROM SECONDARY SITE

BACKGROUND OF THE INVENTION

Businesses employ large-scale data processing systems for processing and reliably storing their business critical data. FIG. 1 shows in block diagram form relevant components of an exemplary data processing system 10. Data processing system 10 includes a primary node $P_{Example}$ in data communication with asynchronous secondary node $AS_{Example}$ and synchronous secondary node $SS_{Example}$. As will be more fully described below, primary node $P_{Example}$ stores a data volume $V_{Example}$ while asynchronous secondary node $AS_{Example}$ and synchronous secondary node $SS_{Example}$ store replicas $RVA_{Example}$ and $RVS_{Example}$, respectively. Replicas $RVA_{Example}$ and $RVS_{Example}$ are maintained as real-time (or near real-time) copies of volume $V_{Example}$ using asynchronous and synchronous replication techniques, respectively.

The devices of primary node $P_{Example}$ are reliable in general. Reliable devices are nonetheless subject to failure as a result of natural disasters, acts of terrorism, hardware failure, or software failure. If primary node $P_{Example}$ fails as a result of, for example, an act of terrorism, data volume $V_{Example}$ will be inaccessible. Replication is one mechanism used by many businesses to ensure reliable access to a data volume. Data replication is well known in the art. Essentially, replication is a process of creating real or near real-time copies (replicas) of a data volume such as data volume $V_{Example}$ shown in FIG. 1. Replicas are typically created and maintained at remotely located secondary nodes such as $AS_{Example}$ and $SS_{Example}$. In the event of failure of primary node $P_{Example}$ as a result of, for example, a natural disaster, requests from client computer systems (not shown) to access data of volume $V_{Example}$ can be redirected to and serviced by one of the secondary nodes $AS_{Example}$ or $SS_{Example}$. For example, suppose a client computer system generates a request to read data from volume $V_{Example}$ after primary host 12 is rendered inoperable. The read request can be redirected to secondary node $AS_{Example}$ or $SS_{Example}$ using mechanisms well known in the art. In response to receiving the read request, secondary nodes $AS_{Example}$ or $SS_{Example}$ can read and return a copy of requested data from replica $RVA_{Example}$ or $RVS_{Example}$.

Primary node $P_{Example}$ includes a primary host (e.g., server computer system) 12 coupled to data storage subsystems 16-20 via storage interconnect 22. For purposes of explanation, storage interconnect 22 will take form in a storage area network (SAN) it being understood that the term storage interconnect should not be limited thereto. SAN 22 may include devices (e.g., switches, routers, hubs, etc.) that cooperate to transmit input/output (IO) transactions between primary host 12 and storage subsystems 16-20.

Each of the data storage subsystems 16-20 includes several physical storage devices. For purposes of explanation, the physical storage devices of 16-20 take form in hard disks, it being understood that the term physical storage device should not be limited to hard disks. Data storage subsystems 16-20 may take different forms. For example, data storage system 16 may consist of "just a bunch of disks" (JBOD) connected to an array controller card. Data storage subsystem 18 may consist of an intelligent disk array. Data storage system 20 may consist of a block server appliance. For purposes of explanation, each of the data storage subsystems 16-20 takes form in a disk array, it being understood that the term data storage subsystem should not be limited thereto.

As noted, each of the disk arrays 16-20 includes several hard disks. The hard disk is the most popular, permanent storage device currently used. A hard disk's total storage capacity is divided into many small chunks called physical memory blocks. For example, a 10 GB hard disk contains 20 million physical memory blocks, with each block able to hold 512 bytes of data. Any random physical memory block can be written to or read from in about the same amount of time, without having to first read from or write to other physical memory blocks. Once written, a physical memory block continues to hold data even after the hard disk is powered down.

Primary host 12 includes an application 24 and a storage manager 26. Storage manager 26 includes a replicator component. Storage manager 26 may take form in software instructions executing on one or more processors of primary host 12. Volume Manager™ provided by VERITAS Software Corporation of Mountain View, Calif., is an exemplary storage manager, it being understood that the term storage manager should not be limited thereto. Although many of the examples described herein will emphasize virtualization architecture and terminology associated with the VERITAS Volume Manager™, the software and techniques described herein can be used with a variety of different storage managers and architectures.

Storage managers perform several functions including the creation of virtualized data storage. Storage virtualization is the technique of aggregating hard disks into virtual disks that typically have better characteristics (e.g., higher storage capacity, greater effective data transfer rates, etc.) than individual hard disks. Hereinafter, virtual disks will be referred to as "storage objects." Storage managers can also aggregate storage objects to create higher level storage objects. Storage objects are abstractions and can be logically viewed as an array of logical memory blocks that store or are configured to store data. While it is said that a logical memory block stores or is configured to store data, in reality the data is stored in at least one physical memory block of a hard disk allocated directly or indirectly to the storage object.

Storage objects aggregated from hard disks can themselves be aggregated to form storage objects called logical data volumes. FIG. 1 illustrates a visual representation of volume $V_{Example}$ employed in primary node $P_{Example}$. Volume $V_{Example}$ includes $n_{max}$ logical memory blocks that store or are configured to store data. FIG. 1 also illustrates replicas $RVA_{Example}$ and $RVS_{Example}$ created and employed in secondary nodes $AS_{Example}$ and $SS_{Example}$, respectively. Replicas $RVA_{Example}$ and $RVS_{Example}$ also contain $n_{max}$ logical memory blocks that store or are configured to store data. Given that replicas $RVA_{Example}$ and $RVS_{Example}$ are maintained as a real-time (or near real-time) copies of volume $V_{Example}$, respective logical blocks n of volume $V_{Example}$ and replicas $RVA_{Example}$ and $RVS_{Example}$ store or are configured to store identical data.

Properties of a data volume depend on how its underlying storage objects or hard disks are aggregated. In other words, the method of aggregation determines the storage object type. In theory, there are a large number of possible methods of aggregation. The more common forms of aggregation include concatenated storage, striped storage, RAID storage, or mirrored storage. A more thorough discussion of how storage objects or hard disks can be aggregated can be found within Dilip M. Ranade [2002], "Shared Data Clusters" Wiley Publishing, Inc., which is incorporated herein by reference in its entirety. To illustrate, presume volume $V_{Example}$ is a two-way mirrored storage object created by storage manager 26 from underlying storage objects M1 and M2. Further, presume storage object M1 is formed by concatenating hard disks d1 and d2 (not shown) of disk array 16, and that storage object M2 is formed by concatenating hard disks d3 and d4 (not shown) of disk array 18. Data volume $V_{Example}$ consists of $n_{max}$ logical memory blocks, and each storage object M1 and M2 consists of $n_{max}$ logical memory blocks as shown in FIG. 1. Because storage objects M1 and M2 are mirrors of volume $V_{Example}$, data within blocks n of M1 and M2 store or are configured to store identical data. It is noted that replicas $RVA_{Example}$ and $RVS_{Example}$ need not be created as two-way mirrored volumes like volume $V_{Example}$. Nonetheless, respective logical blocks n of volume $V_{Example}$, replica $RVA_{Example}$, and $RVS_{Example}$ store or are configured to store identical data.

Storage managers typically create storage object descriptions that describe the relationship between storage objects, their underlying storage objects or hard disks, or other storage objects. Storage object descriptions may identify the existence of one or more replicas of the corresponding storage object. Additionally, storage object descriptions often include configuration maps. A configuration map maps a logical memory block of a corresponding storage object to one or more logical memory blocks of one or more underlying storage objects or to one or more physical memory blocks of one or more hard disks. Storage managers use configuration maps to translate IO transactions directed to one storage object into one or more IO transactions that access data of one or more underlying storage objects or hard disks.

Storage manager 26 creates and stores a description for volume V. This description indicates or is updated to indicate that replicas $RVA_{Example}$ and $RVS_{Example}$ of volume $V_{Example}$ exist in secondary nodes $AS_{Example}$ and $SS_{Example}$, respectively. The description also includes a configuration map for volume $V_{Example}$. The configuration map maps each logical block n of volume $V_{Example}$ to respective logical memory blocks n storage objects M1 and M2.

Application 24 generates IO transactions to write data to volume $V_{Example}$ not knowing that volume $V_{Example}$ is an aggregation of underlying storage objects M1 and M2 and not knowing of the existence of replicas $RVA_{Example}$ and $RVS_{Example}$. IO transactions generated by application 24 are provided to storage manager 26. When storage manager 26 receives an IO transaction from application 24 to write data $D_{new}$ to logical memory block n of volume $V_{Example}$, storage manager 26 accesses the description for volume $V_{Example}$. From the configuration map of the description, storage manager 26 learns that logical memory block n is mapped to logical memory block n in storage objects M1 and M2. Accordingly, storage manager 26 generates first and second IO transactions to write data $D_{new}$ to logical memory block n in storage objects M1 and M2, respectively. From the description, storage manager 26 also learns that after data of logical block n is modified, copies of data in logical memory block n of volume $V_{Example}$ should be sent to secondary nodes $AS_{Example}$ and $SS_{Example}$ to enable updating of replicas $RVA_{Example}$ and $RVS_{Example}$, respectively, and thereby maintain consistency between volume $V_{Example}$ and replicas $RVA_{Example}$ and $RVS_{Example}$ as will be more fully described below.

FIG. 1 shows primary node $P_{Example}$ in data communication with asynchronous secondary node $AS_{Example}$ and synchronous secondary node $SS_{Example}$ via data link 30 and communication network 32. Secondary nodes $AS_{Example}$ and $SS_{Example}$ include secondary hosts (e.g., server computer systems) 38 and 52, respectively. Secondary host 38 is coupled to data storage subsystems 40 and 42 via storage interconnect 44. For purposes of explanation, storage interconnect 44 takes form in a SAN. SAN 44 transmits IO transactions between host 38 and storage subsystems 40 and 42. Likewise, secondary host 52 of secondary node $AS_{Example}$ is coupled to data storage subsystems 54 and 56 via storage interconnect 58. For purposes of explanation, storage interconnect 58 takes form in a SAN. SAN 58 transmits IO transactions between secondary host 52 and storage subsystems 54 and 56. For purposes of explanation, each of the data storage subsystems in secondary nodes $SS_{Example}$ and $AS_{Example}$ will take form in a disk array. Each of the disk arrays in secondary nodes $SS_{Example}$ and $AS_{Example}$ includes several hard disks. The hard disks of secondary node $AS_{Example}$ are allocated to store the contents of replica $RVA_{Example}$, while the hard disks of secondary node $SS_{Example}$ are allocated to store the contents of replica $RVS_{Example}$. Secondary hosts 38 and 52 include applications 46 and 60, respectively, each operating on one or more processors. Applications 46 and 60 are configured to generate IO transactions for accessing data in replicas $RVS_{Example}$ and $RVA_{Example}$, respectively, in response to requests from client computers systems. Lastly, hosts 38 and 52 also include storage managers 48 and 62, respectively.

Replica $RVA_{Example}$ and $RVS_{Example}$ are maintained as a real-time or near real-time copies of volume $V_{Example}$ using asynchronous and synchronous replication techniques, respectively. As noted above, application 24 generates IO transactions to write data to volume $V_{Example}$ not knowing of the existence of replicas $RVA_{Example}$ and $RVS_{Example}$. In general, when data of a logical memory block n of volume $V_{Example}$ is modified according to an IO write transaction generated by application 24, the primary node $P_{Example}$ operating through the replicator component of storage manager 26, can transmit a copy of the data in block n after modification to each of the secondary nodes $AS_{Example}$ and $SS_{Example}$. Each of the secondary nodes $AS_{Example}$ and $SS_{Example}$, in turn, operating through storage managers 62 and 48, respectively, overwrites data existing in logical memory block n of replicas $RVA_{Example}$ and $RVS_{Example}$, respectively, with the copy received from the primary node $P_{Example}$. In synchronous replication, the IO transaction that modifies data of logical block n of data volume $V_{Example}$, is not considered complete until secondary node $SS_{Example}$ acknowledges receipt of the copy of the data of modified logical memory block n. In asynchronous replication, the replicator component of storage manager 26 logs a copy of each data block of the volume $V_{Example}$ that is modified by an IO transaction. Eventually, copies of the logged, modified data blocks are transmitted asynchronously to secondary node $AS_{Example}$. The IO transaction that modifies data of logical memory block n of volume $V_{Example}$ is considered complete when a copy of the modified data block is logged for subsequent transmission to secondary node $AS_{Example}$. Asynchronous replication requires ordering of dependent data modifications to ensure consistency of data between replica $RVA_{Example}$ and volume $V_{Example}$. Synchronous replication does not require ordering.

Copies of data in modified logical memory blocks of volume $V_{Example}$ can be transmitted from primary node $P_{Example}$ to each of the secondary nodes $SS_{Example}$ and $AS_{Example}$ in separate transactions via the data link 30 and communication network 32, respectively. Each of the transactions transmitted to the secondary nodes $AS_{Example}$ and $SS_{Example}$ may include a single modified block of data or multiple modified blocks of data. Either way, each of the secondary nodes $AS_{Example}$ and $SS_{Example}$ receives a copy of each logical block n in volume $V_{Example}$ containing modified data. Existing data in replicas $RVA_{Example}$ and $RVS_{Example}$ are updated with corresponding data received from primary node $P_{Example}$. In other words, data in logical memory block n of replicas $RVA_{Example}$ and $RVS_{Example}$ are overwritten with copies of data in modified logical memory blocks of volume $V_{Example}$ received from primary node $P_{Example}$.

The time needed to update replicas $RVA_{Example}$ and $RVS_{Example}$ depends on the bandwidth of data link 30 and communications network 32. Data link 30 is presumed to have a higher data communication bandwidth when compared to communication network 32. Data link 30 may be able to transmit data between primary node $P_{Example}$ and synchronous node $SS_{Example}$. For purposes of explanation, communication network 32 will take form in the Internet, it being understood that the term "communication network" should not be limited thereto.

Techniques like check-summing or data compression can be used to reduce the amount of data to be transferred from the primary node $P_{Example}$ to the secondary node $AS_{Example}$ via lower bandwidth communication network 32. To illustrate, a Run Length Encoding (RLE) compression algorithm executing on primary host 12 may compress data (e.g., the contents of a logical memory block of volume $V_{Example}$ containing data modified by an IO transaction) before the data is transmitted to asynchronous secondary node $AS_{Example}$. It is noted that either data of a modified logical memory block n of volume $V_{Example}$ or the differences between the data of a modified logical memory block and the data of the logical memory block before modification, can be compressed and transmitted to asynchronous secondary node $AS_{Example}$. Unfortunately, techniques like data compression are processor and/or IO intensive and can unduly burden the processing bandwidth of primary host 12. In other words, while primary host 12 is performing data compression host 12 may not be able to respond quickly to requests from client computer systems to read data from or write data to volume $V_{Example}$. Accordingly, compressing data before it is transmitted to asynchronous secondary node $AS_{Example}$ via communication network 32 may reduce the response time for responding to access requests from client computer systems.

SUMMARY OF THE INVENTION

Efficient replication using assistance from a secondary node involves, in one embodiment, modifying data of a data volume at a primary node to create modified data. The primary node transmits the modified data to a first secondary node, wherein the first secondary node comprises a first replica of the data volume. The first secondary node receives and processes the modified data to generate processed data. The first secondary node transmits the processed data to the primary node. The primary node, in turn, receives and transmits the processed data to a second secondary node, wherein the second secondary node comprises a second replica of the data volume.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
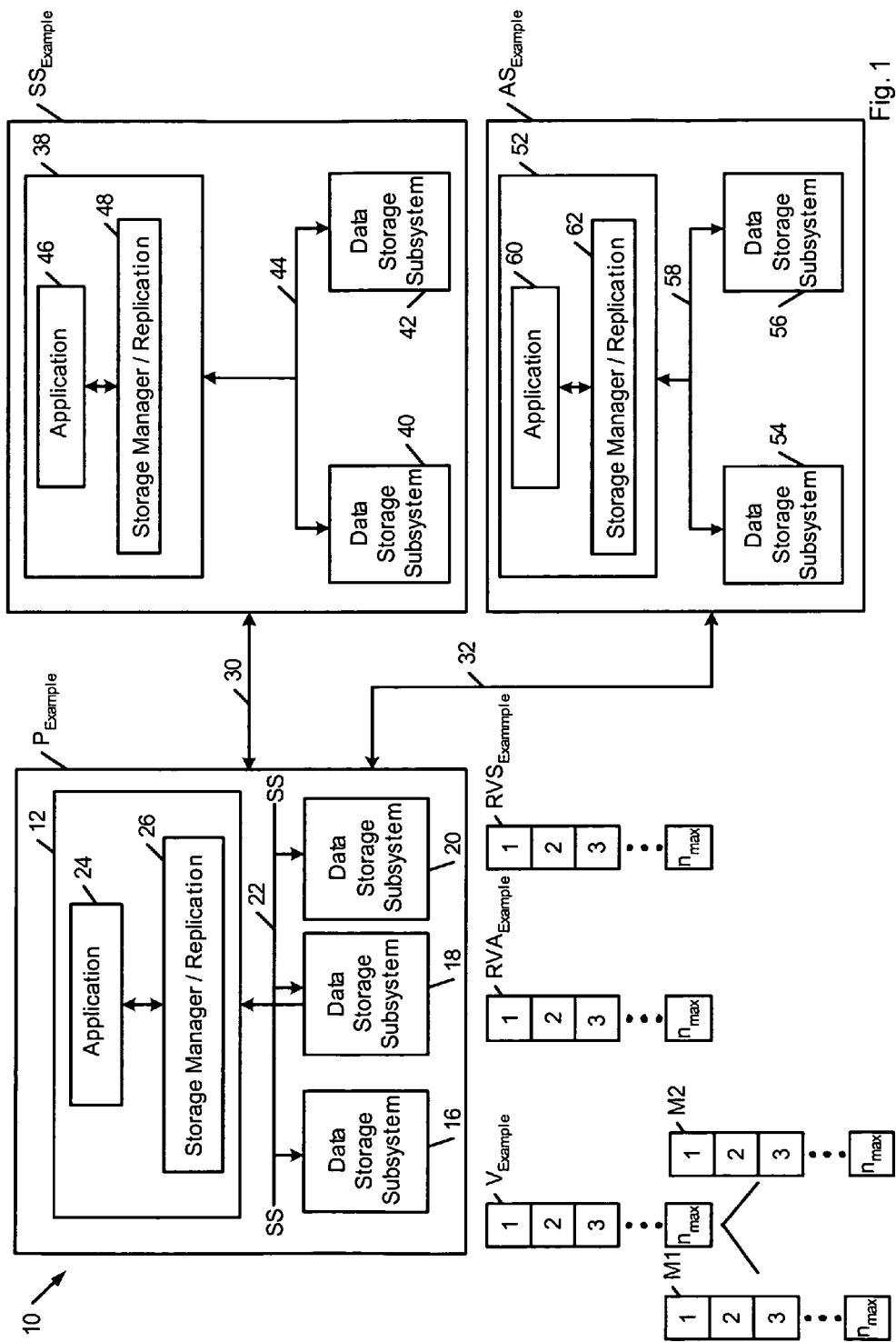
FIG. 1 illustrates a data system in block diagram form in which synchronous and asynchronous replication is employed.
Figure 2:
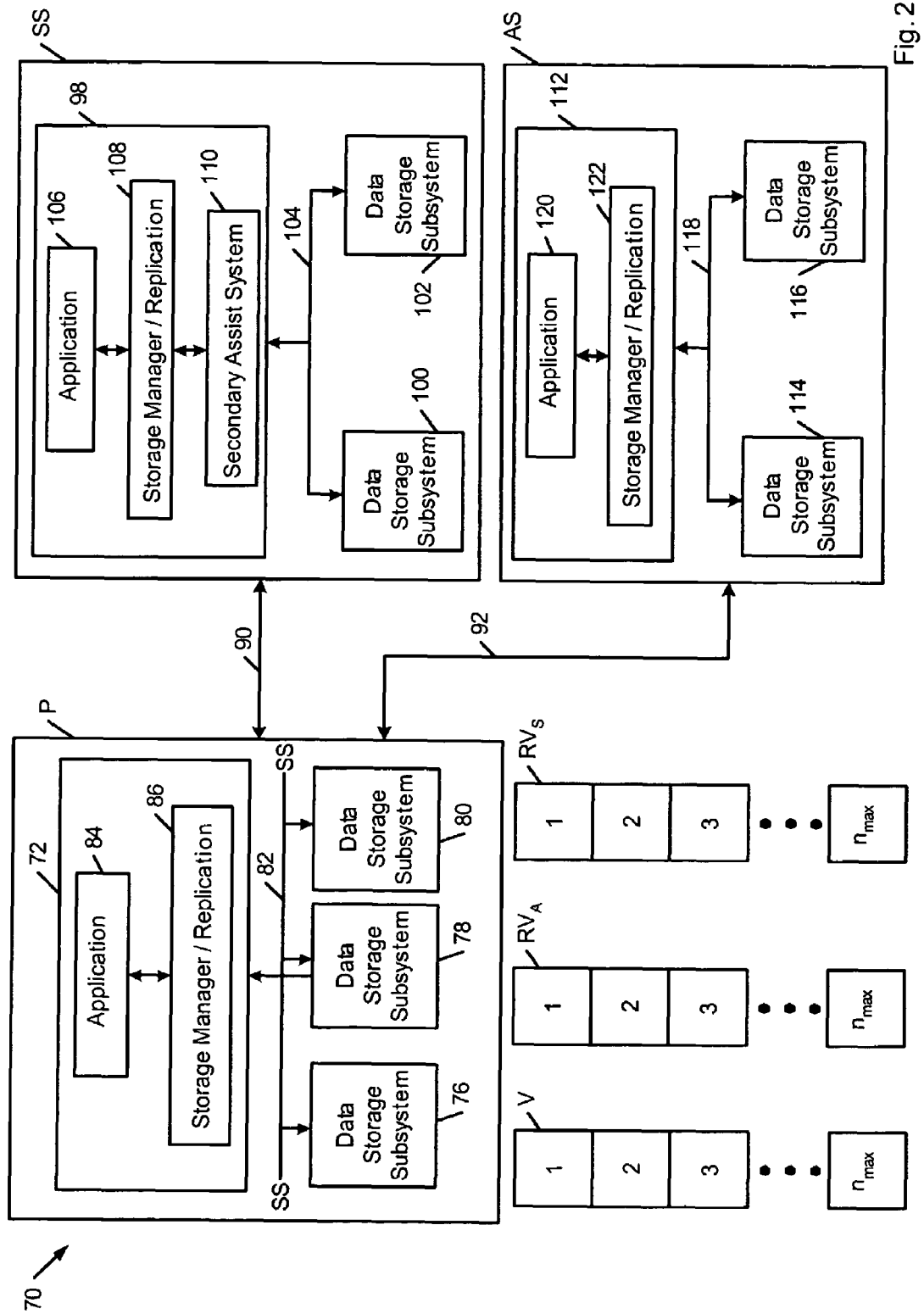
FIG. 2 illustrates in block diagram form relevant components of a data system in which the present invention may be employed and used.

The present invention relates to efficient replication using assistance from a secondary node. FIG. 2 shows relevant components of a data processing system 70 employing one embodiment of the present invention. The present invention should not be limited to that which is shown in FIG. 2.

Data processing system 70 includes a primary node P in data communication with asynchronous secondary node AS and synchronous secondary node SS. As will be more fully described below, primary node P stores a data volume V while asynchronous and synchronous node AS and SS, respectively, store replicas RVA and RVS, respectively, of volume V. Replicas RVA and RVS are maintained as real-time (or near real-time) copies of volume V using asynchronous and synchronous replication techniques, respectively, of one embodiment of the present invention.

Primary node P includes a primary host (e.g., server computer system) 72 coupled to data storage subsystems 76-80 via storage interconnect 82. For purposes of explanation, storage interconnect 82 will take form in a storage area network (SAN). SAN 82 may include devices (e.g., switches, routers, hubs, etc.) that cooperate to transmit input/output (IO) transactions between primary host 72 and storage subsystems 76-80.

For purposes of explanation, each of the data storage subsystems 76-80 takes form in a disk array. Each of the disk arrays 76-80 includes several physical storage devices. For purposes of explanation, the physical storage devices of 76-80 take form in hard disks, it being understood that the term physical storage device should not be limited to hard disks.

Primary host 72 includes an application 84 and a storage manager 86 each executing on one or more processors. Storage manager 86 includes a replicator component, and storage manager 86 performs several functions such as creating data volumes. FIG. 2 shows a visual representation of volume V created by storage manager 86. Volume V includes $n_{max}$ logical memory blocks that store or are configured to store data. FIG. 2 also illustrates replicas RVA and RVS employed in secondary nodes AS and SS, respectively. Each replica RVA and RVS also contains $n_{max}$ logical memory blocks that store or are configured to store data. Given that replicas RVA and RVS are maintained as a real-time (or near real-time) copies of volume V, respective logical memory blocks n of volume V and replicas RVA and RVS store or are configured to store identical data.

Storage manager 86 creates and stores a description for volume V. This description indicates or is updated to indicate that replicas RVA and RVS of volume V exist in secondary nodes AS and SS, respectively. The description also includes a configuration map for volume V. The configuration map maps each logical block n of volume V directly or indirectly to one or more physical memory blocks within one or more hard disks of one or more of the disk arrays 76-80.

Application 84 generates IO transactions to write data to one or more logical memory blocks of volume V not knowing of the existence of replicas RVA and RVS. IO transactions generated by application 84 are provided to storage manager 86. When storage manager 86 receives an IO transaction from application 84 to write new data to a logical memory block n of volume V, storage manager 86 accesses the description for volume V. From this description, storage manager 86 learns replicas exist for volume V, and accordingly after data of logical block n is modified, copies of data in logical memory block n should be sent to secondary nodes AS and SS to enable updating of replicas RVA and RVS, respectively.

FIG. 2 shows primary node P in data communication with synchronous secondary node SS and asynchronous secondary node AS via data link 90 and communication network 92. Data link 90 is presumed to have a higher data transmission bandwidth than communication network 92. Secondary nodes SS and AS include secondary hosts (e.g., server computer systems) 98 and 112, respectively. Secondary host 98 is coupled to data storage subsystems 100 and 102 via storage interconnect 104. For purposes of explanation, storage interconnect 104 takes form in a SAN. SAN 104 transmits IO transactions between secondary host 98 and storage subsystems 100 and 102. Likewise, secondary host 112 of secondary node AS is coupled to data storage subsystems 114 and 116 via storage interconnect 118. For purposes of explanation, storage interconnect 118 takes form in a SAN. SAN 118 transmits IO transactions between secondary host 112 and storage subsystems 114 and 116. For purposes of explanation, each of the data storage subsystems in secondary nodes SS and AS will take form in a disk array. Each of the disk arrays in secondary nodes SS and AS includes several hard disks. The hard disks of secondary node SS are allocated by storage manager 108 to store the contents of replica RVS, while the hard disks of secondary node AS are allocated by storage manager 122 to store the contents of replica RVA.

Secondary hosts 98 and 112 include applications 106 and 120, respectively, each operating on one or more processors. Applications 106 and 120 are configured to generate IO transactions for accessing data in replicas RVS and RVA, respectively, in response to requests from client computers systems. As noted, hosts 98 and 112 also include storage managers 108 and 122, respectively operating on one or more processors.

Replicas RVA and RVS are maintained as a real-time or near real-time copies of volume V using asynchronous and synchronous replication techniques, respectively. As noted above, application 84 generates IO transactions to write data to volume V not knowing of the existence of replicas RVA and RVS. In general, when data of a logical memory block n of volume V is modified according to an IO write transaction generated by application 84, the primary node P, operating through the replicator component of storage manager 86, transmits to secondary node SS a copy of the data in block n after modification. Secondary node SS, in turn, operating through storage managers 108 overwrites data existing in logical memory block n of replica RVS with the copy received from the primary node P. However, before data existing in logical memory block n of replica RVS is overwritten with the copy of data of modified logical block n from primary node P, the copy of data of modified logical block n from primary node P is processed by secondary assist system 110. As will be more fully described below, secondary assist system executes on one or more processors or secondary host 98 in accordance with one or more algorithms.

Copies of data in modified logical memory blocks of volume V can be transmitted from primary node P to secondary node SS via data link 90. Each of the transactions transmitted to the secondary node SS may include a single modified block of data or multiple modified blocks of data. Either way, secondary node SS receives a copy of each logical block n in volume V containing data modified by an IO write transaction. Existing data in replica RVS is updated with corresponding data received from primary node P. In other words, data in logical memory block n of replica RVS is overwritten with a copy of data in modified logical memory block n of volume V received from primary node P.

Secondary assist system 110 processes data of modified logical blocks received from primary P using one or more algorithms contained in or provided thereto. Data processed by secondary assist system 110 is subsequently transmitted to primary node P via data link 90.

Secondary assist system 110 can perform one or more of many complex data operations on data of modified logical blocks received from primary node P. The complex data operations may include (but should not be limited to) encryption, data compression, difference computation, and/or sub-data check sum. Secondary assist system 110 has access to data of replica RVS via storage manager/replicator 108. The results of processing data of modified logical blocks from primary node P by assist system 110 are transmitted back to primary node P.

When performing sub-data check sum, secondary assist system 110 may divide data of modified logical blocks from primary node P into fixed-sized blocks, and checksums of these blocks are used to determine which part of the data has changed. Secondary assist system 110 might access replica RVS, read and process the contents of one or more logical memory blocks therein according to a checksum algorithm in order to determine which part of the data of modified logical blocks from primary node P has changed. Secondary assist system 110 may perform a difference computation on data provided by the primary node P. In difference computation, the difference between new and old data is computed (using operations like XOR) to produce only the differences. Secondary assist system 110 might access replica RVS, read and process the contents of one or more logical memory blocks therein according to a difference computation algorithm. Secondary assist system 110 can perform data compression on data of modified logical blocks from primary node P or on the difference between data of modified logical blocks from primary node P and corresponding data existing within replica RVS. Again, secondary assist system 110 might access replica RVS, read and process the contents of one or more logical memory blocks therein according to a compression algorithm in order to generate a compression of differences. In encryption computing, secondary assist system 110 may encrypt data of modified logical blocks from primary node P or the differences between data of modified logical blocks from primary node P and corresponding data existing within replica RVS.

The results of processing data of modified logical blocks from primary node P by secondary assist system 110 are transmitted back to primary node P via data link 90. Moreover, data of modified logical blocks from primary node P is used to override corresponding data within replica RVS. The overwrite operation may occur before or after secondary assist system 110 processes data of modified logical blocks from primary node P, depending on the algorithm employed by secondary assist system 110.

Primary node P receives the results (e.g., encrypted or compressed data) provided by secondary assist system 110. The results are asynchronously transmitted to secondary node AS via communication network 92. Host 112 implements an algorithm executing on one or more processors and processes the results of secondary assist system forwarded by primary node P to reproduce data of modified logical blocks from primary node P. Host 112 overwrites data within replica RVA with the reproduced data of modified logical blocks from primary node P, thereby bringing replica RVA into synchronization with volume V. The algorithm employed within secondary host 112 to reproduce data of modified logical blocks from primary node P depends upon the algorithm used by secondary assist system 110. For example, where secondary assist 110 employs a compression algorithm to compress data of modified logical blocks from primary node P, secondary host 112 employs a corresponding decompression algorithm to reproduce data of modified logical blocks from primary node P.

Given that CPU and IO intensive tasks like encryption and compression can be performed at secondary node SS, the processing bandwidth of primary node P can be optimized. Moreover, data transfer from primary node P to secondary node AS can be optimized when data is transmitted in, for example, a compressed state. Similarly, the results of processing data of modified logical blocks from primary node P by secondary assist system 110, can be provided by secondary node SS to another asynchronous secondary node AS2 using cascaded asynchronous replication in order to enable the updating of the volume V replica at AS2.

Files are stored within data volumes such as data volume V of primary node P. Each file contains an array of data bytes. A file can be empty of data bytes. That is, it may have 0 length and no data bytes. Each file has corresponding metadata. File data bytes are distinguished from metadata. Metadata includes attributes such as the file length, a time stamp identifying when the file was last accessed (hereinafter the access time stamp), and a time stamp identifying when the file was last modified (hereinafter the modified time stamp).

Performance of data storage is measured by several variables. One variable is access time or the time needed to complete a read or write transaction generated by an application such as application 84. Access time is affected by several factors. One factor relates to file defragmentation. One or more logical memory blocks of a data volume are allocated to store data of a file. A transaction to read data from or write data to a file may require one or more transactions to the underlying data volume, depending on how the file is laid out on the data volume. Access time degrades if file data is stored in logical memory blocks of the data volume in a fragmented manner. A file is fragmented if its data is not laid out in contiguous areas of the data volume.

Another factor that affects access time relates to "hot spots." Hot spots are hard disks that are accessed more frequently compared to an even distribution of accesses over all available hard disks. To illustrate, frequent accesses to a file can result in a hot spot and access time degradation if the data of the file is physically stored in, for example, one hard disk. If data of a frequently accessed file is distributed over several hard disks allocated to the data volume, then no hot spot should develop and the access time to the file should not degrade. Hot spots can also develop within a hard disk or data volume, in which case techniques like caching and pre-fetching can also improve performance.

Performance can be improved by data placement algorithms. These data placement algorithms optimize data placement on the file level or the volume level. The data placement algorithms look at usage patterns, IO patterns and fragmentation to improve performance such as access time. Algorithms for migration of data across storage classes of a storage object, relocation of data to avoid hot spots, de-fragmentation, etc., are popular to achieve data placement optimization. These algorithms need continuous or sporadic statistics to perform their placement optimization process. For example, one or more of the algorithms may need to know how often transactions are generated to access a given hard disk, or how often a particular file is accessed. Tracking IO transactions to hard disks or the number of times an access time stamp of a file changes in a given amount of time can provide the needed statistics. Unfortunately, the gathering of statistics on file usage patterns, IO patterns, and fragmentation consumes a significant amount of processor bandwidth as well as IO bandwidth. The bandwidth of primary node P can be adversely impacted if primary node P is required to gather the statistics needed for data placement optimization algorithms to execute properly.

Secondary node SS replicates the volumes of primary node P at the file and volume level. The layout of the replicated files on replica RVS is the same as the layout on volume V. Changes in file metadata, including changes in the access time stamps, are copied to secondary node SS. Since all writes to volume V on primary node P are also received on secondary node SS, file-system metadata is also available on the secondary node SS, and since the layout of the replicated files on replica RVS is the same as the layout on volume V, secondary node SS can gather the statistics needed for the data placement optimization algorithms of the primary node thereby freeing processing bandwidth of the primary node P for other functions (e.g., responding to requests from client computer systems). Statistics such as usage patterns based on changes in file access time stamps or write patterns (which are partially useful for identifying hot spots) are gathered and transmitted to primary node P via data link 90. Data placement optimization algorithms executing on host 72 process statistics received from secondary node and implement data migration, relocation of hot spots, etc., in volume V thereby optimizing access performance on primary node P. Host 98 may also process statistics gathered at secondary node SS according to data placement optimization algorithms executing on host 72 and implement the same data migration across storage classes within a storage object, relocation of hot spots, etc., in replica RVS as was implemented in volume V. Host 98 can also execute a virtual defragmentation of the replicated file system and pass a defragmentation plan back to primary node P.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
   modifying data of a data volume to create modified data;
   a primary node, comprising a first server, transmitting the modified data to a first secondary node, wherein the first secondary node comprises a first replica of the data volume and the first secondary node comprises a second server;
   the first secondary node receiving and processing the modified data to generate processed data;
   the first secondary node transmitting the processed data to the primary node;
   the primary node receiving and transmitting the processed data to a second secondary node, wherein the second secondary node comprises a second replica of the data volume and the second secondary node comprises a third server;
   the second secondary node receiving and storing the processed data in memory.

2. The method of claim 1 further comprising the first secondary node overwriting data of the first replica with the modified data.

3. The method of claim 1 wherein the first secondary node processes the modified data according to a data compression algorithm.

4. The method of claim 3 further comprising:
   the first secondary node reading data from the first replica in response to receiving the modified data from the primary node;
   the first secondary node processing the modified data and the data read from the first replica according to the data compression algorithm to generate the processed data.

5. The method of claim 1 wherein the first secondary node processes the modified data according to a checksum algorithm.

6. The method of claim 5 further comprising:
the first secondary node reading data from the first replica in response to receiving the modified data from the primary node;
the first secondary node processing the modified data and the data read from the first replica according to the checksum algorithm to generate the processed data.

7. The method of claim 1 wherein the first secondary node processes the modified data according to a data encryption algorithm.

8. The method of claim 1 wherein the first secondary node processes the modified data according to a difference computation algorithm.

9. The method of claim 8 further comprising:
the first secondary node reading data from the first replica in response to receiving the modified data from the primary node;
the first secondary node processing the modified data and the data read from the first replica according to the difference computation algorithm to generate the processed data.

10. The method of claim 1 wherein the primary node transmits the modified data to the first secondary node via a first communication link, wherein the primary node transmits the processed data to the second secondary node via a second communication link, wherein the first communication link is defined by a first data transmission bandwidth, wherein the second communication link is defined by a second data transmission bandwidth, and wherein the first data transmission bandwidth is greater than the second data transmission bandwidth.

11. The method of claim 10 wherein the first replica is maintained as a synchronous replica of the data volume, and wherein the second replica is maintained as an asynchronous replica of the data volume.

12. The method of claim 1 further comprising the first secondary node transmitting the processed data to a third secondary node, wherein the third secondary node comprises a third replica of the data volume.

13. A computer readable storage medium storing instructions executable by a computer system to perform a method, wherein
the computer system is contained in a first secondary node in data communication with a primary node,
the primary node comprises a first server and stores a data volume,
the first secondary node comprises a second server and a first replica of the data volume, and the method comprises:
receiving modified data of the data volume from the primary node;
overwriting data of the first replica with the modified data;
processing the modified data to generate processed data;
the first secondary node transmitting the processed data to the primary node;
the primary node receiving and transmitting the processed data to a second secondary node, wherein the second secondary node comprises a second replica of the data volume and the second secondary node comprises a third server; and
the second secondary node receiving and storing the processed data in memory.

14. The computer readable storage medium of claim 13 wherein the modified data is processed according to a data compression algorithm.

15. The computer readable storage medium of claim 13 wherein the modified data is processed according to a checksum algorithm.

16. The computer readable storage medium of claim 13 wherein the modified data is processed according to a difference computation algorithm.

17. The computer readable storage medium of claim 13 wherein the first replica is maintained as a synchronous replica of the data volume.

18. A computer readable storage medium storing instructions executable by a computer system to perform a method, wherein
the computer system is contained in a first secondary node in data communication with a primary node,
the primary node comprises a data volume,
the first secondary node comprises a first replica of the data volume, and
the method comprises:
receiving modified data of the data volume from the primary node;
overwriting data of the first replica with the modified data;
processing the modified data to generate processed data, wherein the modified data is processed according to a data compression algorithm;
the first secondary node transmitting the processed data to the primary node;
reading data from the first replica;
processing the modified data and the data read from the first replica according to the data compression algorithm to generate the processed data.

19. A computer readable storage medium storing instructions executable by a computer system to perform a method, wherein
the computer system is contained in a first secondary node in data communication with a primary node,
the primary node comprises a data volume,
the first secondary node comprises a first replica of the data volume, and
the method comprises:
receiving modified data of the data volume from the primary node;
overwriting data of the first replica with the modified data;
processing the modified data to generate processed data, wherein the modified data is processed according to a checksum algorithm;
the first secondary node transmitting the processed data to the primary node;
reading data from the first replica;
processing the modified data and the data read from the first replica according to the checksum algorithm to generate the processed data.

20. A computer readable storage medium storing instructions executable by a computer system to perform a method, wherein
the computer system is contained in a first secondary node in data communication with a primary node,
the primary node comprises a data volume,
the first secondary node comprises a first replica of the data volume, and
the method comprises:
receiving modified data of the data volume from the primary node;

overwriting data of the first replica with the modified data;

processing the modified data to generate processed data, wherein the modified data is processed according to a data encryption algorithm; and the first secondary node transmitting the processed data to the primary node.

21. A computer readable storage medium storing instructions executable by a computer system to perform a method, wherein the computer system is contained in a first secondary node in data communication with a primary node, the primary node comprises a data volume, the first secondary node comprises a first replica of the data volume, and the method comprises:

receiving modified data of the data volume from the primary node;

overwriting data of the first replica with the modified data;

processing the modified data to generate processed data, wherein the modified data is processed according to a difference computation algorithm;

the first secondary node transmitting the processed data to the primary node;

reading data from the first replica;

processing the modified data and the data read from the first replica according to the difference computation to generate the processed data.

22. A data system comprising:

a primary node in data communication with first and second secondary nodes via first and second communication links, respectively, wherein the primary node, first secondary node, and second secondary node comprise a first, second, and third server respectively;

the primary node comprising a data volume;

the first and second secondary nodes comprising first and second replicas, respectively, of the data volume;

a primary node comprising means for transmitting modified data of the data volume to the first secondary node;

the first secondary node comprising means for receiving and processing the modified data to generate processed data;

the first secondary node comprising means for transmitting the processed data to the primary node;

the primary node comprising means for receiving and transmitting the processed data to the second secondary node;

the second secondary node receiving and storing the processed data in memory.

23. A method comprising:

modifying data of a data volume to create modified data;

a primary node, comprising a first server, transmitting the modified data to a first secondary node, wherein the first secondary node comprises a first replica of the data volume and the first secondary node comprises a second server;

the first secondary node receiving and processing the modified data to generate processed data, wherein processing data includes counting the number of transactions generated to write data to a hard disk allocated to store data of the data volume replica in a given period of time;

transmitting the processed data to the primary node, wherein the primary node comprises the data volume;

storing the processed data in memory.

24. The method of claim 23 wherein the data volume comprises a file system.

25. The method of claim 23 wherein the data volume comprises a database.

26. The method of claim 23 wherein processing data includes defragmenting a replicated file, and wherein the results comprise an allocation of one or logical memory blocks of the data volume replica to the replicated file.

27. A method comprising:

modifying data of a data volume to create modified data;

a primary node, comprising a first server, transmitting the modified data to a first secondary node, wherein the first secondary node comprises a first replica of the data volume and the first secondary node comprises a second server;

the first secondary node receiving and processing the modified data to generate processed data, wherein processing data includes identifying the number of times an access time stamp changes in a given period of time;

transmitting the processed data to the primary node, wherein the primary node comprises the data volume;

storing the processed data in memory.

* * * * *